United States Patent
Sambhy et al.

(10) Patent No.: US 8,851,630 B2
(45) Date of Patent: *Oct. 7, 2014

(54) LOW ADHESION SOL GEL COATINGS WITH HIGH THERMAL STABILITY FOR EASY CLEAN, SELF CLEANING PRINTHEAD FRONT FACE APPLICATIONS

(75) Inventors: Varun Sambhy, Penfield, NY (US); Kock-Yee Law, Penfield, NJ (US); Hong Zhao, Webster, NY (US); Samarth Chugh, Germantown, MD (US)

(73) Assignee: Xerox Corporation, Norwalk, CT (US)

( * ) Notice: Subject to any disclaimer, the term of this patent is extended or adjusted under 35 U.S.C. 154(b) by 797 days.

This patent is subject to a terminal disclaimer.

(21) Appl. No.: 12/968,713

(22) Filed: Dec. 15, 2010

(65) Prior Publication Data

US 2012/0154487 A1    Jun. 21, 2012

(51) Int. Cl.
| | |
|---|---|
| B41J 2/135 | (2006.01) |
| B41J 2/16 | (2006.01) |
| C08G 65/336 | (2006.01) |
| C08G 65/00 | (2006.01) |
| C09D 171/00 | (2006.01) |
| C08K 5/54 | (2006.01) |

(52) U.S. Cl.
CPC ............. *B41J 2/161* (2013.01); *C08G 65/336* (2013.01); *B41J 2/1606* (2013.01); *C08G 65/007* (2013.01); *C09D 171/00* (2013.01); *C08G 2650/48* (2013.01); *B41J 2/164* (2013.01); *C08K 5/5406* (2013.01)
USPC ............................. 347/45; 427/379; 106/31.13

(58) Field of Classification Search
USPC ................. 347/45; 427/379, 387; 106/31.13; 524/588
See application file for complete search history.

(56) References Cited

U.S. PATENT DOCUMENTS

| | | | |
|---|---|---|---|
| 4,707,420 A | 11/1987 | Wedlake | |
| 4,863,986 A | 9/1989 | Re et al. | |
| 5,305,015 A | 4/1994 | Schantz et al. | |
| 5,677,406 A | 10/1997 | Tazelaar et al. | |
| 5,867,189 A | 2/1999 | Whitlow et al. | |
| 6,071,564 A | 6/2000 | Marchetti et al. | |
| 6,130,687 A | 10/2000 | Bruil et al. | |
| 6,821,327 B2 | 11/2004 | Jaeger et al. | |
| 7,211,131 B2 | 5/2007 | Banning et al. | |
| 7,622,580 B2 | 11/2009 | Banning et al. | |
| 7,655,310 B2 | 2/2010 | Trombetta | |
| 7,699,922 B2 | 4/2010 | Breton et al. | |
| 8,092,913 B2 * | 1/2012 | Rohaut et al. | 428/429 |
| 8,096,649 B2 | 1/2012 | Sambhy et al. | |
| 8,226,207 B2 | 7/2012 | Kovacs et al. | |
| 8,544,987 B2 * | 10/2013 | Sambhy et al. | 347/45 |
| 2004/0077887 A1 | 4/2004 | Banning et al. | |

(Continued)

OTHER PUBLICATIONS

Office Action dated Jan. 31, 2012 in U.S. Appl. No. 12/625,442, 18 pages.

*Primary Examiner* — Daniel Petkovsek
(74) *Attorney, Agent, or Firm* — MH2 Technology Law Group LLP

(57) ABSTRACT

Various embodiments provide oleophobic, low adhesion coatings with high thermal stability and methods of forming and using them in an ink jet printhead, wherein the oleophobic, low adhesion coatings can include a sol-gel cross-linked coating by a self-condensation process of at least a silane-functionalized perfluoropolyether based polymer precursor.

13 Claims, 2 Drawing Sheets

(56) References Cited

U.S. PATENT DOCUMENTS

| | | |
|---|---|---|
| 2004/0082801 A1 | 4/2004 | Jaeger et al. |
| 2004/0167249 A1 | 8/2004 | Banning et al. |
| 2005/0074686 A1 | 4/2005 | Bassi et al. |
| 2005/0140720 A1 | 6/2005 | Silverbrook |
| 2008/0194881 A1 | 8/2008 | Marchionni et al. |
| 2011/0250422 A1* | 10/2011 | Kessman et al. ............... 428/220 |
| 2012/0044298 A1 | 2/2012 | Sambhy et al. |
| 2012/0162312 A1 | 6/2012 | Ahl et al. |

\* cited by examiner

LOW ADHESION SOL GEL COATINGS WITH HIGH THERMAL STABILITY FOR EASY CLEAN, SELF CLEANING PRINTHEAD FRONT FACE APPLICATIONS

DETAILED DESCRIPTION

Background

Conventional ink jet printers create an image on an image substrate by melting ink and delivering the melted ink to a printhead reservoir, where it is then transferred onto the image substrate through a face plate in the printhead. The printhead typically has a front face with a nozzle opening defined therein, through which liquid ink is ejected as droplets onto the recording substrate. The image substrate includes a final print medium (e.g., paper) or an intermediate transfer member (e.g., an image drum). Solid ink images are therefore printed directly onto the paper or first printed on the image drum and then transfixed to the paper.

The inkjet printhead front face becomes contaminated by wetting or drooling of ink. This contamination leads to partial or complete blocking of the nozzle opening, which can prevent ink droplets from being ejected from the nozzle; cause under- or over-sized ink droplets to be ejected from the inkjet printhead; and alter the intended trajectory of ejected ink droplets onto the recording substrate; all of which degrades the print quality of inkjet printers.

The front face of an inkjet printhead is typically coated with a material such as polytetrafluoroethylene (PTFE) (e.g., Teflon®) or perfluoroalkoxy (PFA) for surface protection. As a result, good initial performance has been observed with solid ink. However, the performance degrades over operational lifetime, due to ink adhering to the front face coatings of the printhead at typical ink-ejecting temperatures. The adhesion of the ink then results in a residual ink film, which partially or completely blocks the nozzle opening within the front face of the inkjet printhead. This problem is more severe with UV gel ink, wherein drooling occurs at earlier stage of the ink jet printing. Consequently, wetting and contamination of UV-curable ink are often observed over most of the area of the printhead front face surrounding nozzle openings after a printing run. It is therefore desirable to provide a surface that prevents drooling, improves the robustness and reliability of the front face, and enables additional market penetration for future UV gel ink.

In another example, polyimide-based aperture plates are used in ink jet printheads as depicted in FIG. 1. As shown, the polyimide aperture plate includes an anti-wetting coating material 50 on a polyimide film 12. A stainless steel film is used as an aperture brace 36 and bonded to the coated polyimide aperture plate by an aperture plate adhesive 38. The aperture plate has apertures/nozzles for ink jetting. The anti-wetting coating material 50 is a low adhesion coating to enable a contamination free self-cleaning printhead. Problems arise, however, because of the harsh conditions required for the aperture plate adhesive 38. Typically the aperture plate adhesive requires a temperature of about 290° C. and a pressure of about 350 psi for about 30 minutes to form a bond. These conditions, however, degrade conventional anti-wetting coating materials 50.

Conventionally, contamination of an inkjet printhead front face may be minimized to some extent by adopting purging and wiping procedures. However, these procedures undesirably consume time, energy and/or use excessive amounts of ink, thereby decreasing the useful life of the inkjet printhead.

SUMMARY

According to various embodiments, the present teachings include a coating for an ink jet printhead front face. The coating can be an oleophobic, low adhesion coating having a surface exhibiting a sliding angle of less than about 30° with one or more of an ultra-violet (UV) gel ink drop and a solid ink drop, after the oleophobic, low adhesion coating being exposed to a temperature of higher than about 200° C. for more than about 30 minutes.

According to various embodiments, the present teachings also include a process of forming an oleophobic, low adhesion coating for an ink jet printhead front face. The oleophobic, low adhesion coating can be formed by first hydrolyzing and condensing a reactant mixture including a silane-functionalized perfluoropolyether precursor in presence of trifluoroacetic acid catalyst, water and a solvent. The reactant mixture can then be applied onto a front face substrate and subjected to a curing treatment at a temperature ranging from about 130° C. to 330° C. for a period of time ranging from about 30 minutes to about 2 hours to form a sol-gel cross-linked coating. The sol-gel cross-linked coating can be oleophobic and have a low adhesion with at least one of an ultra-violet (UV) gel ink drop and a solid ink drop.

According to various embodiments, the present teachings further include an ink jet printhead. The ink jet printhead can include a support brace and an aperture plate bonded to the support brace, the aperture plate having an aperture defined therein such that one or more of ultra-violet (UV) gel ink and solid ink are jettable from the printhead through the aperture. The ink jet printhead can also include an oleophobic, low adhesion coating disposed on a front face of the aperture plate. The oleophobic, low adhesion coating can have a surface exhibiting a sliding angle of less than about 30° with one or more jetted ink drops of ultra-violet (UV) gel ink, solid ink, and a combination thereof.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
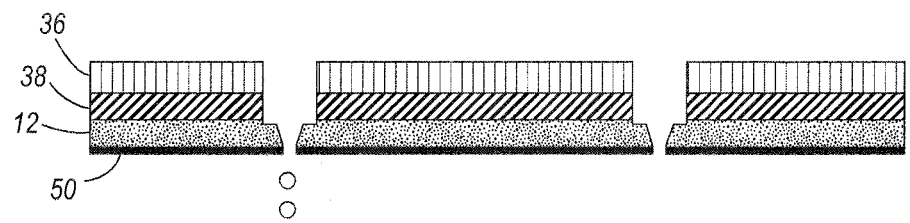
FIG. 1 depicts a conventional polyimide aperture plate.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Various embodiments provide an oleophobic, low adhesion surface coating for an ink jet printhead front face and methods for forming and using the surface coating. The surface coating can include a thermally stable sol-gel cross-linked coating. The sol-gel cross-linked coating can be used as an anti-wetting, easy clean, or self clean coating for ink jet printhead aperture plates due to low adhesion between ink and the coating surface.

When the surface coating is disposed on an ink jet printhead front face, one or more of jetted drops of ultra-violet (UV) gel ink (also referred to herein as "UV ink") and/or jetted drops of solid ink can exhibit low adhesion with the coating surface. As used herein, the term "ink drops" can refer to the jetted drops of ultra-violet (UV) gel ink and/or jetted drops of solid ink. In embodiments, the adhesion of an ink drop towards a surface can be determined by measuring the sliding angle of the ink drop. As used herein the term "sliding angle" refers to an angle at which a surface is inclined relative to a horizontal position when the ink drop begins to slide over the coating surface without leaving residue or stain behind. The lower the sliding angle, the lower the adhesion between the ink drops and the coating surface. As used herein, the term "low adhesion" means a low sliding angle of less than about 30° when measured with UV ink, solid ink and/or their ink drops on the printhead front face. In some embodiments, the low sliding angle can be less than about 25°, or less than about 20°, when measured with these ink drops on the printhead front face. In other embodiments, the low sliding angle can be about 1° or greater, when measured with these ink drops on the printhead front face.

The disclosed oleophobic, low adhesion surface coating can be "thermally stable" or can have a "high thermal stability." As used herein, the term "high thermal stability" or "thermally stable" means that the material properties (e.g., oleophobicity, or low adhesion) are stable and remain substantially unchanged at high temperatures and/or high pressures for a certain time length. For example, ink drops of ultra-violet gel ink and/or solid ink can exhibit or maintain low adhesion towards the oleophobic, low adhesion surface coating, after the oleophobic, low adhesion surface coating has been exposed to high temperatures of about 200° C. or higher, or in a range between about 200° C. and about 330° C., or between about 250° C. and about 290° C., and/or at high pressures of about 100 psi or higher, e.g., in a range between about 100 psi and about 400 psi, for an extended time length, e.g., in a range between about 10 minutes and about 2 hours, or between about 30 minutes and about 2 hours. In one embodiment, the oleophobic, low adhesion surface coating can be thermally stable after the surface coating has been exposed to a temperature of about 290° C. or higher at a pressure of about 350 psi or higher for about 30 minutes or longer.

In embodiments, the high thermal stability of the disclosed oleophobic, low adhesion surface coating can be alternatively described by the property stability at a temperature lower than about 200° C. but for an extended longer time such as for about 2 days or longer. For example, ink drops of UV gel ink and/or solid ink can exhibit a sliding angle of less than about 30° and a contact angle of greater than 45° with the surface of the oleophobic, low adhesion coating after the oleophobic, low adhesion coating has been soaked in a molten solid ink or UV gel ink at a temperature in a range between 70° C. and 150° C., or between 100° C. and 150° C., or between 120° C. and 150° C., for at least about 2 days.

The oleophobic, low adhesion surface coating can be bonded to a stainless steel aperture brace at high temperatures and high pressures without degradation. Additionally, the resulting printhead can prevent ink contamination because ink droplets can roll off the printhead front face leaving no residue behind due to use of the oleophobic, low adhesion surface coating.

The oleophobic, low adhesion surface coatings with high thermal stability can include a sol-gel cross-linked coating. The sol-gel cross-linked coating can be used as an anti-wetting easy clean, self clean coating for ink jet printhead aperture plates due to low adhesion between ink drops and the coating surface. The sol-gel cross-linked coating can provide the ink jet printhead aperture plates with high drool pressure due to its oleophobicity. Generally, the greater the ink contact angle the better (higher) the drool pressure. Drool pressure relates to the ability of the aperture plate to avoid ink weeping out of the nozzle opening when the pressure of the ink tank (reservoir) increases. The sol-gel cross-linked coatings can be thermally stable and provide low adhesion with ink drops of ultra-violet gel ink and/or solid ink even after exposure to high temperatures and/or high pressures for extended periods of time, thereby maintaining high drool pressures.

Advantageously, the oleophobic, low adhesion surface coatings described herein provide, in combination, low adhesion and high contact angle for ink drops of ultra-violet curable gel ink and/or solid ink, which further provides the benefit of improved drool pressure or reduced (or eliminated) weeping of ink out of the nozzle.

Figure 2:
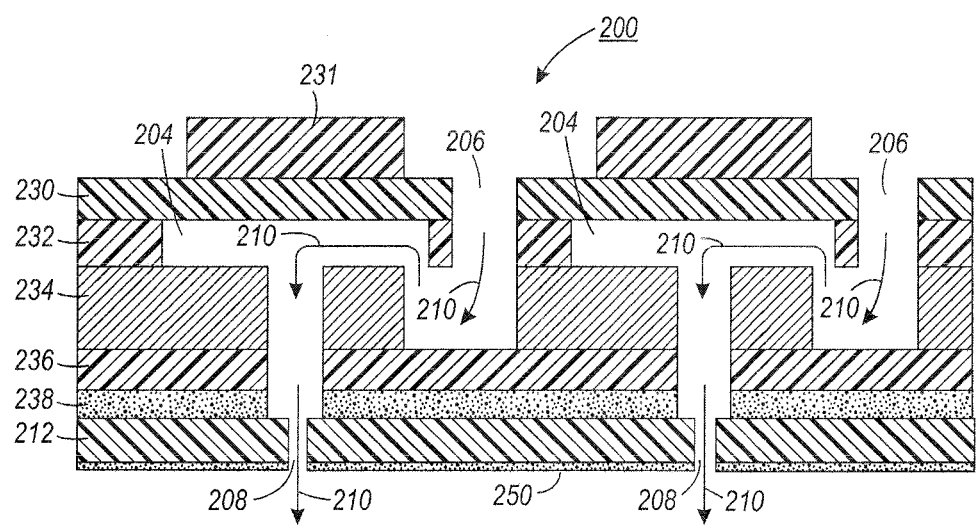
FIG. 2 depicts a portion of an exemplary printhead in accordance with various embodiments of the present teachings.

FIG. 2 depicts a portion of an exemplary printhead 200 in accordance with various embodiments of the present teachings. Note that although FIG. 2 illustrates a drop-on-demand ink jet printhead, one of ordinary skill in the art would understand that the disclosed sol-gel cross-linked coating can be used for any types of printhead as desired to provide an oleophobic, low adhesion front face plate surface with high thermal stability.

As shown in FIG. 2, the exemplary printhead 200 can include multiple laminated plates or sheets stacked in a superimposed relationship and can be made of a material including, for example, stainless steel, polyimide, and/or other known materials. As shown, these sheets or plates can include a diaphragm plate 230 with a transducer 231 (e.g., a PZT device) on one surface, an ink pressure chamber plate 232, an inlet/outlet plate 234, an aperture brace plate 236 (also referred to as "support brace"), an aperture plate adhesive 238, and an aperture plate 212, which is also referred to as an orifice plate or printhead front face plate.

The printhead 200 can also include one or more ink pressure chambers 204 coupled to or in communication with one or more ink sources 206, and one or more ink ejection apertures/outlets, for example, apertures, orifices, nozzles or outlets 208. A typical ink jet printer can include a plurality of ink pressure chambers 204 with each pressure chamber 204 coupled to one or more apertures/outlets 208. For simplification, two exemplary outlets 208 are illustrated in FIG. 2, although the exemplary printhead can include more or less than two outlets. Each aperture/outlet 208 can be coupled to or communicate with an ink pressure chamber 204 by way of an ink passage indicated by arrows 210. Ink can pass through aperture/outlet 208 during ink drop formation. Ink drops can travel in a direction along the path 210 from apertures/outlets 208 toward a print medium (not shown), such as a paper or an image drum, which can be spaced from apertures/outlets 208. The apertures/outlets 208 can be formed in the aperture plate 212 on the outlet side of the exemplary ink jet printhead.

In embodiments, as shown in FIG. 2, the exemplary ink jet printhead can also include a sol-gel cross-linked coating 250 disposed along the aperture plate 212. The sol-gel cross-linked coating 250 can be an oleophobic, low adhesion surface coating with high thermal stability and can be compatible with printhead manufacturing processes.

The sol-gel cross-linked coating 250 can have an oleophobic surface. As used herein, the term "oleophobic" refers to a surface wettability of the sol-gel cross-linked coating 250 with oils including, for example, hexadecane, dodecane, hydrocarbons, organic-based ink including solid ink and UV gel ink, etc. The oleophobic surface of the sol-gel cross-linked coating 250 can have an oil contact angle of at least about 45°, for example, at least about 60°, or ranging from about 45° to about 90°.

The sol-gel cross-linked coating 250 can be a low adhesion coating layer. Generally, on the surface of a low-adhesion coating, a ~10-15 µL oil-based drop will tend to bead up and slide on the surface having a sliding angle with the low-adhesion coating surface. In embodiments, the oil-based drop can be solid ink or UV gel ink drop.

An oil-based drop can have a low sliding angle with the surface of the sol-gel cross-linked coating 250, wherein the low sliding angle can be less than about 30°, for example, ranging from about 1° to about 30°, or from about 1° to about 25°, or from about 1° to about 15°, when measured with the oils (e.g., hexadecane), and organic-based inks like solid ink or UV gel ink.

The sol-gel cross-linked coating 250 can have high thermal stability. For example, surface oleophobicity and low adhesion property (i.e., with low sliding angle) of the sol-gel cross-linked coating 250 can be substantially maintained at high temperatures of, for example, about 200° C. or higher, or ranging from about 200° C. to about 330° C., or from about 250° C. to about 330° C., or from about 250° C. to about 290° C. for at least about 30 minutes, or from about 30 minutes to about 120 minutes, or from about 60 to about 120 minutes. In embodiments, the surface oleophobicity and low adhesion property of the sol-gel cross-linked coating 250 can have high thermal stability and can be substantially maintained at the above described high temperatures and time lengths, and/or at a pressure of, for example, about 100 psi or higher, or from about 100 psi to about 400 psi, or from about 250 psi to about 400 psi.

As used herein, unless otherwise specified, the term "sol-gel cross-linked coating" refers to a coating material that is formed from a polymer precursor by a sol-gel process, wherein the sol-gel process allows self-condensation and/or self-cross-linking reactions of the precursor polymer. In embodiments, the sol-gel cross-linked coating can have a cross-link density.

In a sol-gel process, a suitable precursor or combination of precursors can be hydrolyzed to generate a solid state polymeric silicon-oxygen network. The initial hydrolysis of the precursor(s) generates a liquid solution (i.e., sol) that ultimately becomes a gel. The sol-gel process can therefore include the stages or steps of forming a sol-gel solution, gelation (i.e., polymerization), and drying.

As disclosed herein, the sol-gel solution can include an alkoxy silane precursor that can undergo cross-linking reactions among themselves during the sol-gel process. In one embodiment, the alkoxy silane precursor can have at least two alkoxy silane groups to allow self-condensation reactions of the precursor polymer, and to provide a desirable cross-link density of the formed coating layer.

For example, the gelation or polymerization stage of the sol-gel process can be a two-step reaction including hydrolysis of the alkoxy silane precursor followed by condensation of the hydrolyzed precursor. The initiation of the polymerization reaction is typically performed via a hydrolysis of alkoxide groups to form hydroxylated —Si—OH groups. Propagation then occurs by the polycondensation of these hydroxylated species giving rise to silane-oxygen polymers. That is, the polycondensation can lead to the formation of OSiO bridges and the removal of other species such as water. In embodiments, the OSiO bridges or the silicon-oxygen network can be two-dimensional or three-dimensional.

Exemplary silane-functionalized perfluoropolyether polymer precursor used to form the disclosed sol-gel cross-linking coating 250 can have a general formula of:

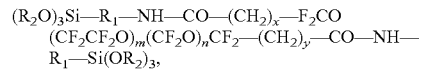

wherein m ranges from about 1 to about 50, n ranges from about 0 to about 10, x and y range from about 0 to 10 and R1 and R2 independently are alkyl groups with a general formula of $C_zH_{2z+1}$, where z ranges from 1 to 20. For example, R2 can be $C_2H_5$. In one embodiment, the sum amount of m and n can range from about 40 to about 180, and the ratio of m/n can be from about 0.5 to about 2.0.

Figure 3:
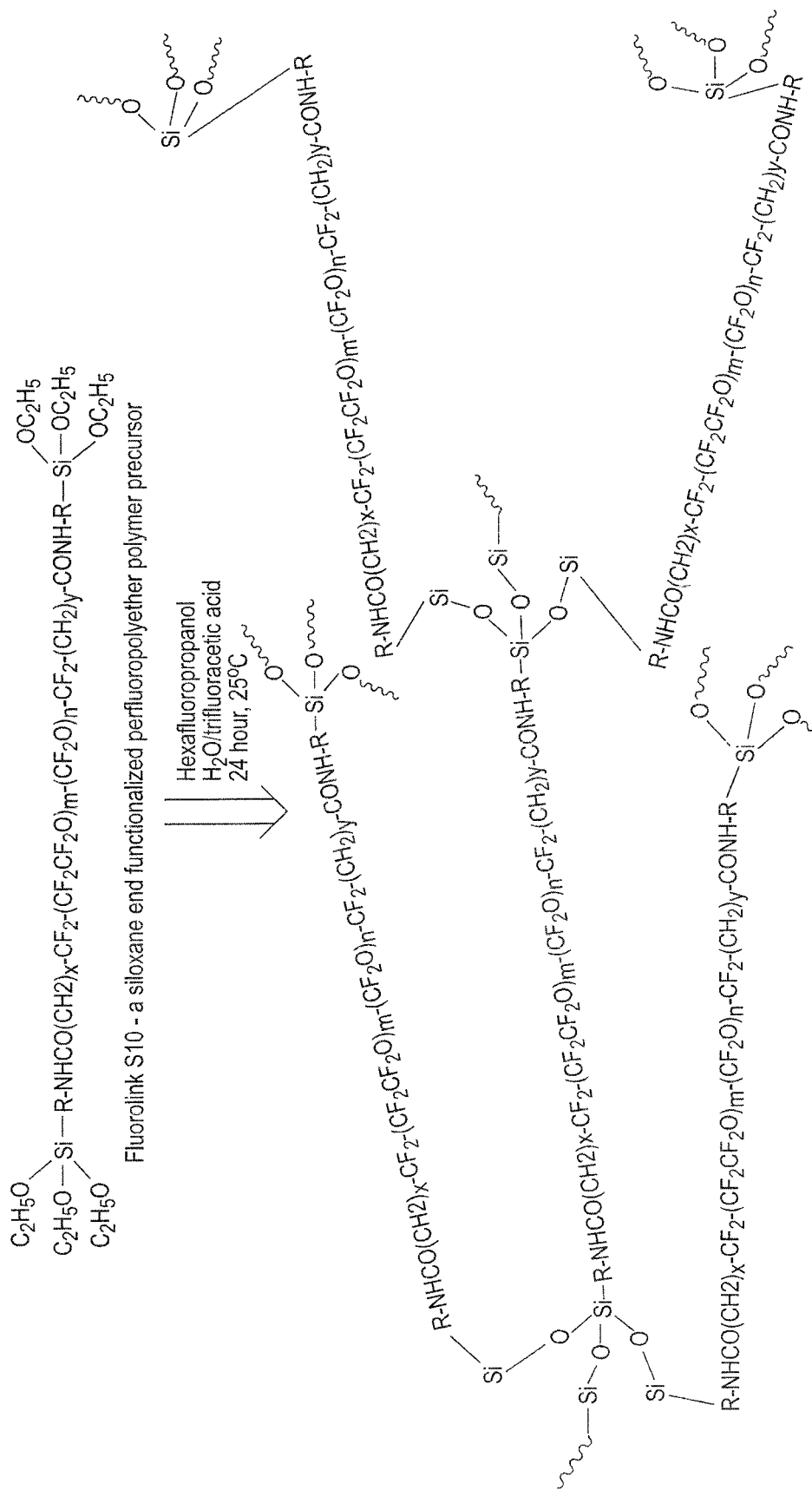
FIG. 3 depicts sol-gel formation of an exemplary low adhesion cross-linked coating from a silane-functionalized perfluoropolyether polymer precursor in accordance with various embodiments of the present teachings.

In embodiments, the siloxane-functionalized perfluoropolyether polymer precursor used can be Fluorolink® S10 with ethoxysilane ($R_2$=$C_2H_5$) groups. Fluorolink S10 is commercially available from Solvay-Solexis (West Deptford, N.J.). The ethoxysilane groups of Fluorolink® S10 can hydrolyze and readily react among themselves in the presence of a catalyst including, for example, an acid or a base and optionally water, to form a highly cross-linked material including perfluoropolyether chains bridges by Si—O—Si siloxane units. The sol-gel cross-linked Fluorolink® S10 can be used as an example of "siloxane bridged perfluoropolyether" for forming the sol-gel cross-linked coating 250 of FIG. 2. FIG. 3 depicts a sol-gel formation of an exemplary siloxane bridged perfluoropolyether coating in accordance with various embodiments of the present teachings. The sol-gel cross-linking reaction shown in FIG. 3 can provide a highly cross-linked polymer material.

In embodiments, the perfluoropolyether silane precursor, e.g., Fluorolink® S10, can be optionally co-hydrolyzed in the presence of another fluorinated silane precursor having a general formula of:

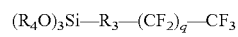

Wherein q ranges from about 1 to about 20, and $R_3$ and $R_4$ independently are alkyl groups with a general formula of $C_zH_{2z+1}$, where z is from 1 to 10.

Various embodiments also provide a method of forming an ink jet printhead using the disclosed oleophobic, low adhesion coating. An aperture plate of the ink jet printhead can be formed by first forming a sol-gel solution that includes one or more polymer precursors including a silane-functionalized perfluoropolyether precursor, a fluorinated silane precursor, and a combination thereof.

For example, the sol-gel solution can be a reactant mixture formed by first dissolving the silane-functionalized perfluoropolyether precursor, e.g., Fluorolink® S10, in a hexafluoropropanol solvent, followed by an addition of trifluoroacetic acid catalyst and water in the hexafluoropropanol solvent. The reactant mixture can then be stirred at a temperature of about 25° C. to about 100° C. for a time length of about 30 minutes to about 24 hours. In embodiments, the silane-functionalized perfluoropolyether precursor can be present within the sol-gel solution in a range between about 1% to 50% by weight of the total reactant mixture.

The sol-gel solution can then be applied to and cured (or dried) on the aperture plate (also referred to as a front face plate substrate, see 212 of FIG. 2) of an ink jet printhead. Various coating and printing techniques as known to one of ordinary skill in the art can be used to apply the sol-gel solution to a surface of the aperture plate. The applied sol-gel solution can then be cured, e.g., at a temperature ranging from about 130° C. to about 330° C. for about 30 minutes to about 2 hours to form a sol-gel cross-linked coating, as disclosed herein, on the aperture plate. In embodiments, the formed sol-gel cross-linked coating (see 250 of FIG. 2) can have a thickness ranging from about 0.1 microns to about 5.0 microns, or from about 0.5 microns to about 3.0 microns, or from about 1.0 micron to about 2.0 microns.

In embodiments, the aperture plate (see 212 of FIG. 2) can include, for example, polyimide, steel, silicon, nickel, copper, aluminum and a mixture thereof. In embodiments, the aperture plate can be a polyimide aperture plate.

The coated aperture plate can then be attached with an aperture brace (see 236 of FIG. 2) on an opposing surface of the sol-gel cross-linked coating (see 250 of FIG. 2). For example, an aperture plate adhesive (see 238 of FIG. 2) can be used to bond the coated aperture plate and the aperture brace at a temperature of, for example, about 200° C. or higher for about 30 minutes or longer, and/or at a pressure of about 100 psi or higher. In one embodiment, the bonding temperature can be at about 290° C., and the bonding pressure can be at about 350 psi. Following the attaching/bonding process, one or more apertures (see 208 of FIG. 2) can then be formed in the aperture plate, for example, using the laser ablation technique or other known techniques.

In this manner, the formed aperture plate coated by the sol-gel cross-linked coating can have a high oil contact angle (e.g., higher than about 45°) to maintain adequate drool pressure and a low sliding angle (e.g., less than about 30°) for easy clean, self clean effect of the printhead front face even at high temperatures of about 200° C. or higher and/or a pressure of about 100 psi or higher for about 30 minutes or longer. The disclosed sol-gel cross-linked coating on an exemplary polyimide substrate can have high thermal stability. For example, it can be heated to a temperature of about 325° C. for about 30 minutes and subsequently retain its high contact angle of about 62° with hexadecane and about 72° with solid ink and retain its low sliding angle of about 13° with hexadecane and about 16° with solid ink.

EXAMPLES

Example 1

About 1.5 g of Fluorolink® S10 (obtained from Solvay-Solexis) was dissolved in about 15 mL of hexafluoropropanol solvent in a glass bottle, followed by an addition of about 0.1 g water and about 2 drops of trifluoroacetic acid (TFA) as catalysts. The contents were stirred for about 24 hours at room temperature, and were then coated on a polyimide substrate using drawbar coater.

Coating 1 was cured by ramping up the temperature at a rate of about 5° C./min from room temperature to about 290° C. and then held at about 290° C. for about 30 minutes.

Coating 2 was cured by ramping up the temperature at a rate of about 5° C./min from room temperature to about 310° C. and then held at about 310° C. for about 30 minutes.

Coating 3 was cured by ramping up the temperature at a rate of about 5° C./min from room temperature to about 325° C. and then held at about 325° C. for about 30 minutes.

Contact angles and sliding angles of the coatings were determined on an OCA20 goniometer from Data Physics (Hailsham, East Sussex, United Kingdom), which includes a computer-controlled automatic liquid deposition system, computer-controlled tilting base unit (TBU90E), and a computer-based image processing system. The results are shown in Table 1.

TABLE 1

| Siloxane bridged perfluoropolyether coating | Conditions | Solid ink contact angle (Sliding angle) | Hexadecane contact angle (Sliding angle) |
| --- | --- | --- | --- |
| Coating 1 | t = 30 min., 290° C. | 75.7° (15.8°) | 64.7° (13.5°) |
| Coating 2 | t = 30 min., 310° C. | 72.3° (15.5°) | 63.1° (13.3°) |
| Coating 3 | t = 30 min., 325° C. | 71.9° (15.7°) | 61.6° (13.5°) |

In a typical static contact angle measurement, about 5 microliters of hexadecane or about 3 microliter of UV ink at a typical ink jetting temperature of about 80° C. and about 1 microliter solid ink at typical ink jetting temperature of about 115° C. were gently deposited on a surface of the coatings shown in Table 1. The static angle was determined by the computer software (SCA20) and each reported data was an average of >5 independent measurements.

Sliding angle measurements were conducted by tilting the base unit at a rate of about 1°/sec with an about-10-microliter droplet for hexadecane, UV ink at typical ink jetting temperature of about 80° C. and solid ink at typical ink jetting temperature of about 115° C., using titling base unit TBU90E. The sliding angle was defined as the inclination angle of a coated polyimide substrate at which the test drops (UV ink or solid ink) began to slide off the coated polyimide substrate without leaving residue or stain behind.

As shown in Table 1, the formed siloxane bridged perfluoropolyether had desired thermal stability even after heated to a temperature of about 290° C., 310° C., or 325° C. for about 30 minutes. The siloxane bridged perfluoropolyether coatings retained high contact angles and low sliding angles after baking at these temperatures. The siloxane bridged perfluoropolyether coatings can be used as anti-wetting, self-cleaning coatings for polyimide printhead aperture plate.

Example 2 (Comparative Example)

A stainless steel printhead was prepared using the process described in U.S. Pat. No. 5,867,189. The aperture plate was coated with PFA using an E-Beam sputtering technique, thereby forming Coating 4. The contact angle and sliding angle of the Coating 4 were determined according to the procedure in Example 1, and the data are summarized in Table 2. Comparatively, the contact angle for Coating 4 was similar to those of Coatings 1-3; however, the sliding angle for Coating 4 was significantly larger than the sliding angles of Coatings 1-3. Low sliding angles are translated to low adhesion between the ink drops and the coating surface, whereas high sliding angles are translated to high adhesion between the ink drops and the coating surface.

TABLE 2

| Coating | Solid Ink Contact Angle (Sliding Angle) | UV Ink Contact Angle (Sliding Angle) |
| --- | --- | --- |
| Coating 4 (PFA) | 85.0° (~70°) | 63.0° (flowing leaving ink residue) |

Example 3

Ink aging experiments were performed by soaking Coating 1 in a mixture of molten cyan, magenta, yellow, and black ink at about 140° C. for about 2 days. The contact angle and sliding angle, before and after ink aging, were then determined and summarized in Table 3. The data show that Coating 1 fabricated with the procedure in Example 1 was robust against ink aging as indicated by high contact angle and low sliding angle after 2 days of ink immersion.

TABLE 3

| | Solid Ink Contact Angle (Sliding Angle) | |
| --- | --- | --- |
| Coating | t = 0 | t = 2 days |
| Coating 1 | 75.7° (15.8°) | 61.3° (20.0°) |

Example 4

Offline tests were performed simulating adhesive bonding step of printhead fabrication. Coating 1 was subjected to a high temperature and high pressure bonding step, e.g., at about 290° C. and at about 300 psi for about 30 minutes. The contact angle and sliding angle, before and after the bonding step, were then determined and summarized in Table 4. As shown, Coating 1 maintained high contact angle and low sliding angle after the adhesive bonding at 290° C. and 300 psi.

TABLE 4

| | Solid Ink Contact Angle (Sliding Angle) | |
| --- | --- | --- |
| Coating | Before bonding | After bonding |
| Coating1 | 75.7° (15.8°) | 76.2 (19.9) |

Example 5

An exemplary printhead was fabricated using an oleophobic, low adhesion coating. In this example, an array of nozzles were first fabricated on a polyimide film coated by a low adhesion coating, such as the Coating 1 in Example 1, using the laser ablation technique. The polyimide film was then aligned to a stainless steel aperture brace and bonded using a high temperature adhesive at about 290° C. under 300 psi for half an hour. The resulting aperture assembly, which included aperture plate with the low adhesion coating of the Coating 1, was then attached and bonded to the jet stack/PZT assembly and manifold, resulting in a printhead. The front face of the resulting printhead exhibited surface properties identical to those of the Coatings 1-4 as shown in Examples 1-4.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising."

Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A coating for an ink jet printhead front face comprising:
an oleophobic, low adhesion coating, wherein a surface of the oleophobic, low adhesion coating, after a temperature exposure of greater than about 200° C. for more than about 30 minutes, exhibits a sliding angle of less than about 30° with one or more of an ultra-violet (UV) gel ink drop and a solid ink drop,
wherein the low adhesion coating is a sol-gel cross-linked coating.

2. The coating of claim 1, wherein the sliding angle is less than about 20°.

3. The coating of claim 1, wherein the surface of the oleophobic, low adhesion coating exhibits a contact angle of about 45° or greater with the one or more of the ultra-violet (UV) gel ink drop and the solid ink drop after the temperature exposure.

4. The coating of claim 1, wherein the surface of the oleophobic, low adhesion coating exhibits a contact angle of about 55° or greater with the one or more of the ultra-violet (UV) gel ink drop and the solid ink drop after the temperature exposure.

5. The coating of claim 1, wherein the one or more of the UV gel ink drop and the solid ink drop exhibit a sliding angle of less than about 30° and a contact angle of greater than about 45° with the surface of the oleophobic, low adhesion coating, after a temperature exposure of less than about 330° C. at a pressure of less than about 400 psi for a period of time in a range between about 30 minutes and about 2 hours.

6. The coating of claim 1, wherein the one or more of the UV gel ink drop and the solid ink drop exhibit a sliding angle of less than about 30° and a contact angle of greater than 45° with the surface of the oleophobic, low adhesion coating, after the oleophobic low adhesion coating being soaked in a molten solid ink or UV gel ink at a temperature ranging from about 70° C. to about 150° C. for at least about 2 days.

7. The coating of claim 1, wherein the oleophobic, low adhesion coating is prepared by a method comprising hydrolysis and condensation of a silane-functionalized perfluoropolyether precursor, and optionally a fluorinated silane precursor.

8. The coating of claim 7, wherein the silane-functionalized perfluoropolyether precursor has a general formula of

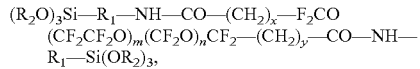

wherein m ranges from about 1 to about 50, n ranges from about 0 to about 10, x and y range from about 0 to 10, and R1 and R2 independently are alkyl groups with a general formula of $C_zH_{2z+1}$, where z ranges from 1 to 20.

9. The coating of claim 7, wherein the optional fluorinated silane precursor has a general formula of $(R_4O)_3Si-R_3-(CF_2)_q-CF_3$, wherein q ranges from about 1 to about 20, and $R_3$ and $R_4$ are alkyl group with general formula of $C_zH_{2z+1}$, where z is from 1 to 10.

10. An ink jet printhead comprising:
a support brace;
an aperture plate bonded to the support brace, the aperture plate having an aperture defined therein, wherein one or more of ultra-violet (UV) gel ink and solid ink are jettable from the printhead through the aperture; and
an oleophobic, low adhesion coating disposed on a front face of the aperture plate, wherein a surface of the oleophobic, low adhesion coating, after a temperature exposure of greater than about 200° C. for more than about 30 minutes, exhibits a sliding angle of less than about 30° with one or more jetted ink drops comprising one or more of an ultra-violet (UV) gel ink and a solid ink,
wherein the low adhesion coating is a sol-gel cross-linked coating.

11. The printhead of claim 10, wherein the surface of the oleophobic, low adhesion coating exhibits a contact angle of greater than 45° with the one or more jetted ink drops.

12. The printhead of claim 10, wherein the oleophobic, low adhesion coating is prepared by a method comprising hydrolysis and condensation of a silane-functionalized perfluoropolyether precursor, an optional fluorinated silane precursor, and a combination thereof.

13. The printhead of claim 10, wherein the surface of the oleophobic, low adhesion coating further exhibits a contact angle of greater than 45° with the one or more jetted ink drops, after the oleophobic, low adhesion coating being exposed to a temperature of about 200° C. to about 330° C. at a pressure of about 100 psi to about 400 psi.

* * * * *